Sept. 23, 1952         C. R. TURNER         2,611,855
ELECTRIC BLANKET CONTROL
Filed May 2, 1947         4 Sheets-Sheet 1
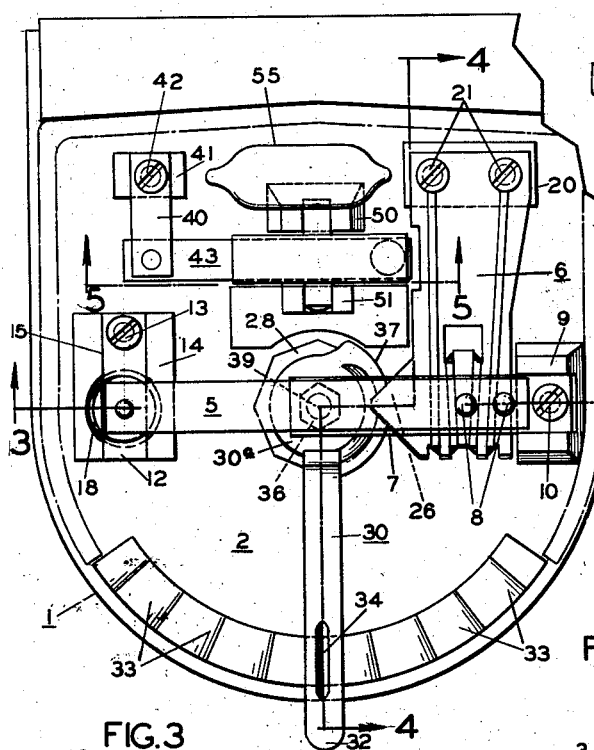
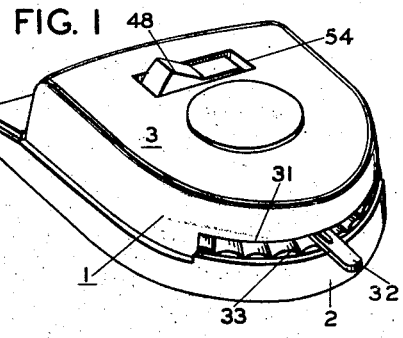
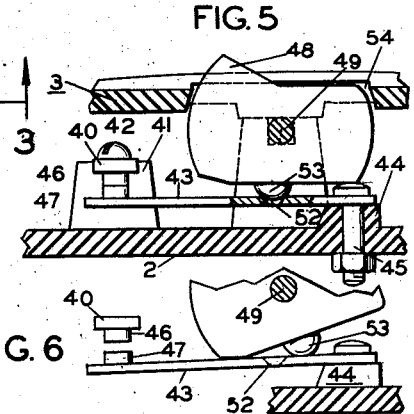
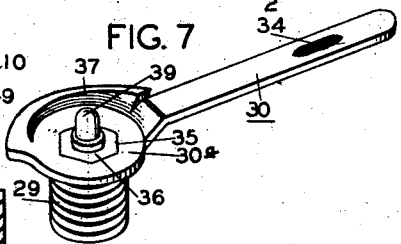
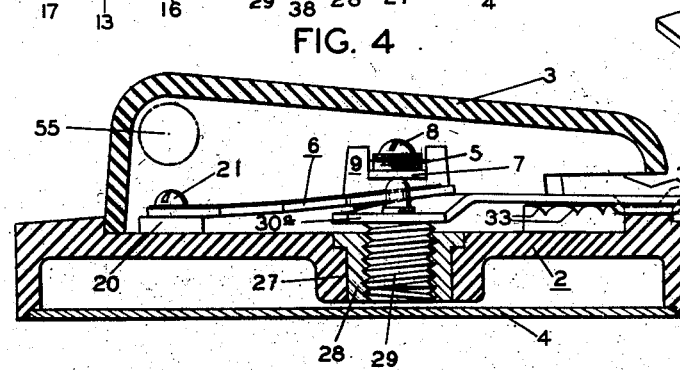
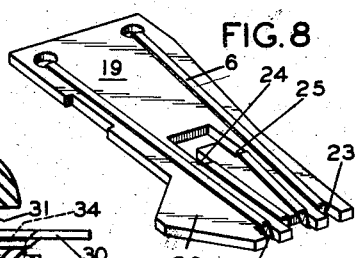
INVENTOR
CHARLES ROGER TURNER
BY HIS ATTORNEYS
Howson & Howson Sept. 23, 1952 — C. R. TURNER — 2,611,855
ELECTRIC BLANKET CONTROL
Filed May 2, 1947 — 4 Sheets-Sheet 2
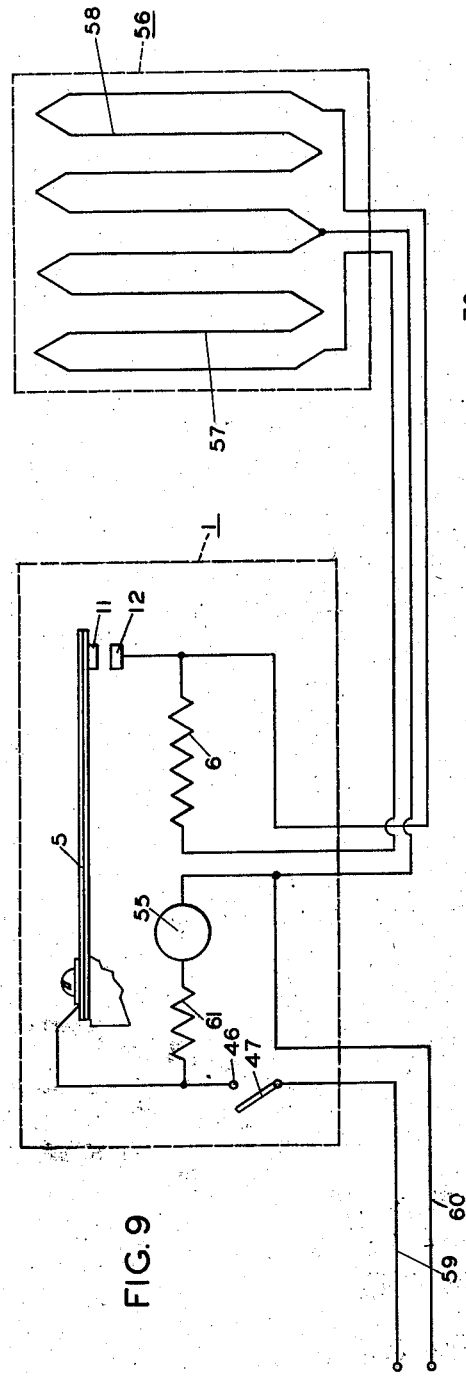
FIG. 9
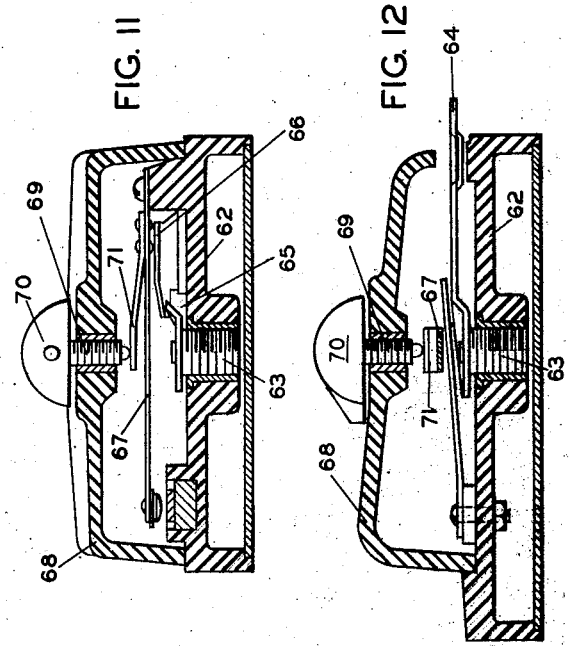
FIG. 11
FIG. 12
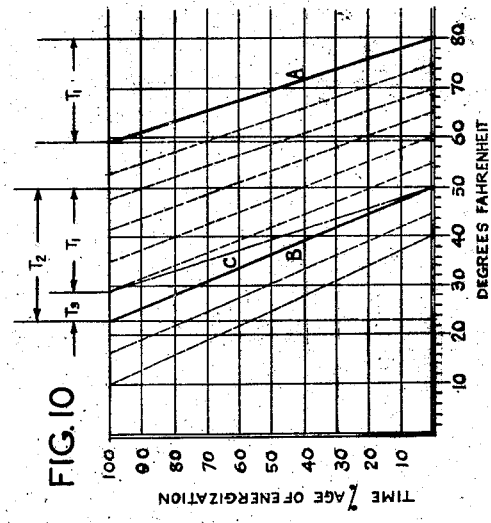
FIG. 10
INVENTOR
CHARLES ROGER TURNER
BY HIS ATTORNEYS
Howson & Howson Sept. 23, 1952      C. R. TURNER      2,611,855
ELECTRIC BLANKET CONTROL
Filed May 2, 1947      4 Sheets-Sheet 3
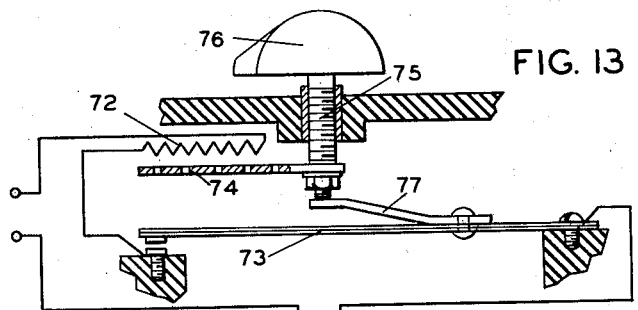
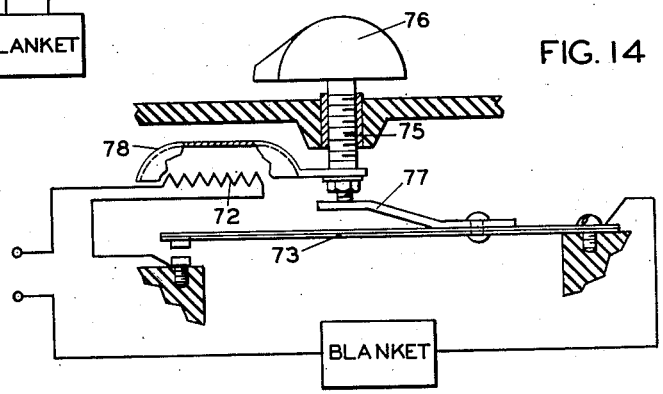
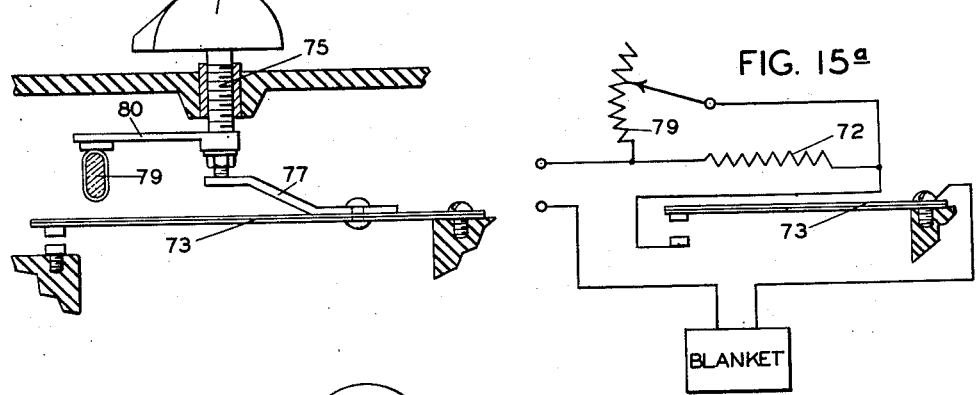
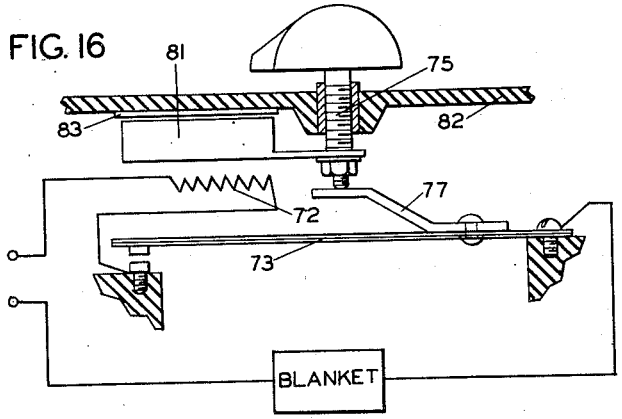
INVENTOR
CHARLES ROGER TURNER
BY HIS ATTORNEYS
Howson & Howson Sept. 23, 1952              C. R. TURNER              2,611,855
ELECTRIC BLANKET CONTROL
Filed May 2, 1947                                    4 Sheets—Sheet 4
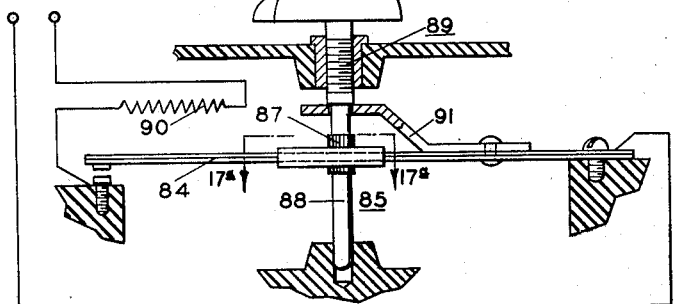
FIG. 17
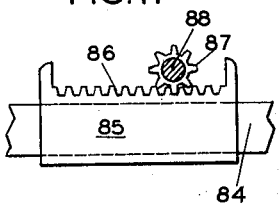
FIG. 17ª
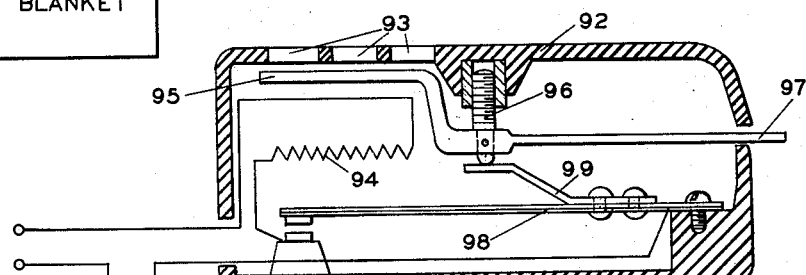
FIG. 18
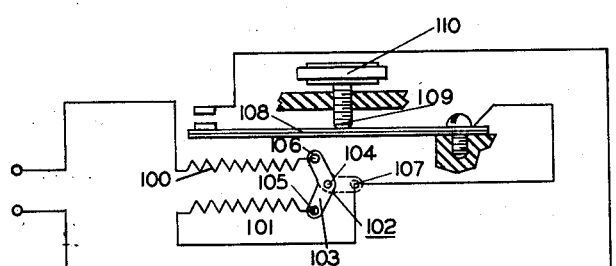
FIG. 19
INVENTOR
CHARLES ROGER TURNER
BY HIS ATTORNEYS
Howson & Howson Patented Sept. 23, 1952

2,611,855

UNITED STATES PATENT OFFICE 2,611,855

ELECTRIC BLANKET CONTROL

Charles Roger Turner, Enfield, Pa., assignor to Proctor Electric Company, Philadelphia, Pa., a corporation of Pennsylvania Application May 2, 1947, Serial No. 745,383

12 Claims. (Cl. 219—46)

This invention relates to the control of an electrically heated object whose temperature it is desired to control in relation to the ambient air temperature. One example of such an object is an electrically heated blanket, and the invention will be described with reference to its application to a blanket, although it is applicable to other objects such as electrically heated wearing apparel for aviators or others having use therefor.

It has been assumed heretofore that in order to provide maximum comfort to the user of an electric blanket or the like, the temperature of the blanket should be maintained constant, irrespective of variations of the ambient air temperature. Accordingly, prior electric blankets have been provided with a control device which responds to the temperature of the ambient air and which varies the electrical energy input to the blanket in inverse relation to the ambient air temperature to such an extent that the blanket temperature is maintained constant. Although such devices have provision for selecting the ambient air temperature at which the blanket becomes energized, the blanket when energized, is maintained at a constant temperature.

I have discovered, however, that the aforementioned assumption is erroneous and that maximum comfort to the user of an electric blanket or the like is not assured by maintaining the blanket temperature constant. Due to the fact that the loss of heat from the body varies somewhat with changes of the ambient air temperature, a certain blanket temperature which provides maximum comfort at one temperature of the ambient air will not provide the same comfort at a substantially lower ambient air temperature. In the case of a sleeping person, not only is there involved increasing loss of heat from exposed parts of the body as the ambient air temperature decreases, but there is also involved an increasing loss of heat through the bed which has constant thermal insulating characteristics. Furthermore, there is an increased loss of heat through respiration. It should be noted further that there are factors which variously affect the comfort of different persons, some of which are: sleeping habits, respiratory losses, metabolism, etc.

With the foregoing in mind, the principal object of the present invention is to provide improved control apparatus for an electric blanket or other electrically heated article which is intended to provide warmth to living beings, to the end that maximum comfort will be assured for any user under any and all conditions.

Another object of the invention is to provide a control apparatus for an electric blanket or the like which is adapted to vary the temperature of the blanket in inverse relation to the ambient air temperature.

A further object of the invention is to provide, in such a control apparatus, means whereby the user may vary the rate at which the blanket temperature changes, thus enabling the user to choose the rate of change of the blanket temperature to meet his particular requirements for maximum comfort. I have found that in order to provide maximum comfort under all conditions of use and for all types of users, it is necessary to provide means for varying the amount of change of blanket energization for a given change in room temperature. When an electric blanket is used on a bed which affords unusually poor thermal insulation, more change of blanket energization is required for a given change in room temperature, and vice versa and when an extra cover is used over the electric blanket, as is frequently the case in very cold bedrooms, a lower rate of change in blanket energization is required. Similarly, a person who feels the need for supplemental heat only when the room temperature is very low, usually needs a lower rate of change in that supplemental heat than a person whose comfort depends on supplemental heat in a bedroom which is only slightly cool. Thus, there is a correlation between the need for adjustment of the room temperature at which the blanket becomes energized and the need for adjustment of the amount of change in blanket energization per degree of change in room temperature.

Another object of the invention, therefore, is to provide such a control apparatus having provision for varying synchronously the temperature at which the blanket becomes energized and the rate of change of the blanket temperature, such synchronous control being effected by a single manual control element.

A further object of the invention is to provide an alternative form of the control apparatus having independently operable means for varying the temperature at which the blanket becomes energized and the rate of change of the blanket temperature.

Other objects and features of the invention will be apparent from the following detailed description with reference to the accompanying drawings wherein:

Fig. 1 is a perspective view of a control device provided according to the present invention;

Fig. 2 is a plan view of the device with the cover removed;

Fig. 3 is a sectional view taken along line 3—3 of Fig. 2;

Fig. 4 is a sectional view taken along line 4—4 of Fig. 2;

Fig. 5 is a fragmentary sectional view taken along line 5—5 of Fig. 2;

Fig. 6 is a similar view showing the parts in different position;

Figs. 7 and 8 are perspective views of certain elements of the device;

Fig. 9 is a diagrammatic illustration of a control circuit for an object, such as an electric blanket, employing the control device illustrated in Figs. 1 to 8;

Fig. 10 is a graphic illustration of the operation of an electric blanket according to the present invention;

Figs. 11 and 12 are sectional views, similar to Figs. 3 and 4, illustrating a different form of the control device;

Figs. 13 to 19 are diagrammatic illustrations of various embodiments of the control device.

Referring more particularly to the drawings, the device illustrated in Figs. 1 to 8 is a preferred embodiment of an apparatus for controlling the temperature of an object, such as an electric blanket, in relation to the ambient air temperature, as hereinbefore mentioned. This device is electrically connected to the said object so as to control the electrical energization thereof, but is located out of heat conducting relation with said object.

Referring to Figs. 1 to 8, the device is designated generally by reference character 1 and it comprises a housing for the operating elements, which housing may include a base member 2, an upper cover 3 and a lower cover 4. The parts of the housing are preferably formed of a suitable insulating material such as Bakelite, and they may be secured together in any suitable fashion.

During operation, the control of the energization of the object being controlled is effected by means of a bimetal element 5 and a cooperative electrical heater 6, as will be described in detail hereinafter. The bimetal element or strip 5 is secured to a resilient mounting arm 7, as by means of rivets 8, the supported end of arm 7 being seated in a recess at the top of a mount 9 on base 2, and being secured thereon by means of a bolt 10 extending through the base as illustrated. The free end of the bimetal element 5 carries a contact 11 which is adapted to engage a metal strip 12 secured to the base by means of a bolt 13. As shown in Figs. 2 and 3, the base 2 is formed to provide a mounting block 14 having a recess 15 to accommodate the strip 12, and also having a cup-shaped recess 16 to accommodate a magnetic member 17 which underlies the strip 15 and is retained thereby. A magnetic washer 18, secured by the rivet contact 11, is carried at the end of the bimetal strip 5, and when the end of said strip is in close proximity to strip 12, the pull of magnet 17 on the steel washer 18 causes positive engagement between contact 11 and strip 12 which constitute a switching means for controlling the energizing circuit of the object being controlled.

The above-mentioned heater 6 comprises a length of resistance wire or ribbon mounted on an insulating arm 19 (see Fig. 8) one end of which is secured to a raised portion 20 of base 2 (Fig. 2) by means of screws 21 which also serve as terminal members for the heater 6. The end portion of arm 19 and the portion of the heater 6 on said end portion are in proximity to the bimetal strip 5 which is influenced by the heater 6 as hereinafter described. As shown in Figs. 2 and 8, arm 19 is formed to provide recesses 22 to 25, and the heater 6 is arranged thereon so as to concentrate a substantial portion of the heater 6 in the vicinity of the bimetal strip 5, so that the heater exerts substantial heating influence on the bimetal strip. The mounting arm 19 for the heater 6 also has a projecting portion 26, the purpose of which will appear presently.

In the device under discussion, provision is made for synchronously varying the temperature at which the blanket or other object becomes energized and the rate of change of the blanket temperature. As shown in Fig. 3, the base 2 has a centrally-located downwardly-extending boss 27 which supports a metal bushing or sleeve 28. The latter threadedly supports a sleeve 29 on the upper end of which there is mounted an arm 30 (see Fig. 7) which projects outwardly through a relatively wide slot 31 (see Fig. 1) in the housing or casing. The projecting end 32 of arm 30 is manually movable through an arc defined by the said slot. Within the slot opening 31, the base 2 is formed to provide a surface 33 having successive rises and depressions so as to define discrete adjustment steps for the arm 30, the latter having a depressed portion 34 which is adapted to seat in the successive recesses of surface 33. Since arm 30 is fixedly secured to sleeve 29, rotation of said arm causes axial movement of sleeve 29 through a small range.

As clearly shown in Fig. 7, arm 30 is secured to the upper end of sleeve 29 by means of a plate or ring 30a to which the arm 30 is integrally joined, said plate having a non-circular opening 35 to accommodate a complementary non-circular extension 36 on sleeve 29. Also integral with the plate 30a is a cam 37 which engages the projection 26 on the mounting arm 19 of the heater 6. Manual rotation of arm 30, as hereinbefore mentioned, causes rotation of cam 37 which causes movement of the heater 6 in relation to the bimetal element 5, thus varying the heating effect of said heater upon the bimetal element.

The manually adjustable sleeve 29 threadedly carries a screw 38 (see Fig. 3) which has an extended head 39 engaging the mounting arm 7 of the bimetal element 5. Longitudinal movement of sleeve 29, as hereinbefore mentioned, effects similar longitudinal movement of screw 38 and thus varies the position of the bimetal element 5. The adjustability of screw 38 relative to sleeve 29 provides for factory adjustment of the device.

From the foregoing description, it will be seen that the manual adjustment of arm 30 does two things. It varies the position of the bimetal element 5 so as to vary the temperature at which the blanket or other object will become energized, and it also varies the position of heater 6 in relation to the bimetal element so as to vary the rate of change of the blanket temperature. This will be understood more clearly from the subsequent description of the operation.

The device illustrated in Figs. 1 to 8 also includes an on-off switch as shown particularly in Figs. 2, 5 and 6. A resilient contact arm 40 has one end seated in a recess in a mounting block 41 and secured thereto by a screw 42. Another resilient contact arm 43 has one end secured to a mount 44 on base 2 by means of a bolt 45. The said arms carry contacts 46 and 47 at their free ends. Arm 43 is operable to open and close said contacts by means of a manually operable member 48 having a transverse mounting pin 49 which is rotatably supported in bearing supports 50 and 51. Arm 43 has a recess or opening 52 therein, while member 48 has a protruding portion 53 which is adapted to seat in said recess. Member 48 projects through an opening 54 in the upper cover of the housing as shown in Fig. 1, and is movable between two portions to effect closing and opening of contacts 46 and 47, as shown in Figs. 5 and 6.

The device 1 also includes a glow lamp 55 (see Fig. 2) which is energized when the manual control switch is in its "on" position, thus indicating that the apparatus is operative. The cover 3 is preferably translucent so as to be visibly illuminated when the lamp is lit.

It is essential to the proper operation of the device that the bimetal element 5 be subjected to the temperature of the ambient air. The slot 31 and the opening 54 permit free flow of air through the housing and past the element 5, but if necessary, additional openings may be provided in the housing.

Referring now to Fig. 9, the device 1 is diagrammatically illustrated in conjunction with an electric blanket 56 having a heating element which preferably comprises two sections 57 and 58 adapted to be connected in parallel relation as hereinafter described. Since the present invention is not concerned with the construction of the blanket 56, it suffices to state that the electrically heated blanket may be of conventional construction.

The supply lines which serve to supply electrical energy to the heating element of the blanket from any suitable source are indicated at 59 and 60. The energizing circuit extends from conductor 59 through the manual switch 46, 47, through the bimetallic element 5 and the switch 11, 12 controlled thereby and thence through two parallel branches to the other supply conductor 60. One of said parallel branches includes heater 6 and section 57 of the blanket heating element, while the other branch includes section 58 of the blanket heating element. The glowlamp 55 is connected across the supply conductors on the load side of switch 46, 47 and has a current limiting resistor 61 in series with it.

When the apparatus of Fig. 9 is in operation, i. e., when switch 46, 47 is closed, the thermostatic bimetal element 5 is affected both by the ambient air temperature and by the action of heater 6. The construction of the bimetal element 5 is such that decreasing temperature causes it to flex in a direction to move contact 11 toward contact 12, while increasing temperature causes it to flex in the opposite direction to move contact 11 away from contact 12. As the ambient air temperature decreases, the bimetal element 5 moves contact 11 toward contact 12, and the two contacts close at a certain ambient air temperature, depending upon the manual adjustment of the arm 30 as above described. Closure of contacts 11 and 12 effects energization of the blanket heating element and also renders heater 6 operative. The heat generated by heater 6 causes a rise in temperature of the bimetal element 5 and the latter eventually flexes upward sufficiently to open contacts 11 and 12 and thus interrupt the supply of energy to the blanket heating element, at the same time rendering heater 6 inoperative. The bimetal element 5 then commences to cool and the above-described operation is repeated. Thus the blanket heating element is supplied with energy during intervals whose duration increases as the ambient air temperature decreases. In other words, the electrical energy supplied to the blanket is varied in inverse relation to the ambient air temperature.

In accordance with the present invention, the electrical energy supplied to the blanket is caused to vary to such an extent that the temperature of the blanket varies in inverse relation to the ambient air temperature. This is in contradistinction to prior devices of this character, wherein the temperature of the blanket has been maintained constant irrespective of variations of the ambient air temperature. The variation of the blanket temperature is accomplished by providing a heater 6 having such heating capacity in relation to that of the blanket heating element that, even when the heater 6 is in a position to exert its maximum heating effect on the bimetal element 5, it is incapable of preventing a rise in blanket temperature as the ambient air temperature decreases under conditions of actual use. The aforementioned extreme adjustment would be made only under conditions of use wherein the insulation value of the electric blanket, energized, is supplemented by additional blankets on it, and/or the mattress is of exceptional insulating material as is the case of a feather mattress. In these instances a very small energy input to the blanket would be adequate to raise the blanket temperature as the ambient temperature decreased. Thus, the rise in blanket temperature with decrease in ambient temperature is attained as a result of selection, by the user, of the correct setting for his immediate comfort, in the case of the synchronous control device above described.

It will be realized from the foregoing description that the heater 6 serves to interrupt the energization of the blanket, and as the ambient air temperature decreases, the heater 6 becomes less and less effective to limit the energy supplied to the blanket. By providing a heater of predetermined low heating capacity, the energy supplied to the blanket is caused to increase to such an extent, with decreasing ambient air temperature, that the temperature of the blanket rises. For the reasons set forth at the beginning of this specification, the feature here described is a very important one which makes for greater comfort of the user of the blanket at various ambient air temperatures and under various conditions.

It will be understood that the heating capacity of the heater 6 will be chosen according to the heating capacity of the blanket heating element in any instance. In the apparatus of Fig. 9, each section of the blanket heating element may have a resistance of about 140 ohms, and the heater 6 should then have a resistance of 1.4 ohms, when impressed voltage across 59, 60 is in the range 110–115.

In further accordance with the present invention, the rate at which the blanket temperature changes, with varying ambient air temperature, is adjustable by the user to best suit his particular needs. This is accomplished in the control device illustrated in Figs. 1 to 8 by means of the manual adjustment of the position of heater 6 with respect to the bimetal element 5. Thus, assuming that heater 6 is in the position for maximum effect on the bimetal element, if the heater is moved away from that position it becomes less effective to retard the energization of the blanket, and consequently, the blanket energization is caused to have a greater increase for a given decrease of the ambient air temperature.

As previously indicated, there is a correlation between the need for adjustment of the initial operating temperature, i. e. the room temperature at which the blanket becomes energized, and the need for adjustment of the amount of change in blanket energization per degree of change in room temperature. In view of this correlation, it is desirable to correlate the two adjustments, as in the device of Figs. 1 to 8. Fig. 10 is a graphic illustration showing the respective rates of change in the energization of the blanket for different settings of the device of Figs. 1 to 8. Two of the curves (A and B) are shown in solid lines while the other curves are shown in dotted lines, the only purpose of this being to make curves A and B stand out as examples. The curves of Fig. 10 were derived by means of laboratory and field tests of the device. Curve A shows the operation for a high setting such as to effect energization of the blanket at and below a room temperature of 80° F., while curve B shows the operation for a low setting such that energization of the blanket is effected at and below a room temperature of 50° F. It will be noted that the rate of change of the blanket energization is greater in the case of curve A than it is in the case of curve B. Stated differently, it required less of a temperature drop to reach 100% energization in the case of curve A than it did in the case of curve B. The temperature drop required in the case of curve A is represented as $T_1$, while that in the case of curve B is represented as $T_2$. The dot and dash line C is parallel to curve A, and $T_3$ represents the difference between the two temperature ranges. From this illustration, it will be seen that when the device of Figs. 1 to 8 is set for operation at the highest selectable room temperature, the blanket energization increases at a certain rate to give a certain increase of blanket temperature as the ambient air temperature decreases; and as the setting is decreased to lower the initial operating temperature, the blanket energization increases at a lower rate.

The manner in which the device of Figs. 1 to 8 affects the above-described correlation may be seen by referring again to those figures, particularly Figs. 2, 3, and 7. When arm 30 is moved to the extreme left-hand position, as viewed in Fig. 2, the head 39 of screw 38 is in its lowermost position so that the bimetal element 5 is in its lowermost position to effect blanket energization at a relatively high room temperature, e. g. 80° F. At such time, the low point of cam 37 is effective and the heater 6 is at its maximum distance from the bimetal element. Consequently the heater 6 exerts a minimum influence on the bimetal element, so that there is a maximum increase of blanket energization with decrease of the ambient air temperature, as represented by the curve A of Fig. 10.

When the arm 30 is in the extreme right-hand position, as viewed in Fig. 2, the head 39 of screw 38 is at its highest point and the bimetal element 5 is raised to its highest position so as to effect blanket energization at a relatively low room temperature. At the same time, the high point of cam 37 is effective, and the heater 6 is at its minimum distance from the bimetal element 5. Consequently the heater 6 exerts its maximum influence on the bimetal element, and the rate of change of blanket energization with decreasing air temperature is substantially less than in the first instance, as shown by the curves of Fig. 10.

It will be apparent from the foregoing discussion that the design of the cam 37 will determine the successive rates of change of blanket energization with decreasing air temperature for different settings of the arm 30, as represented by the successive curves in Fig. 10. By suitable design of the cam, the successive rates may be caused to be increasingly divergent to give much lower rates at the low settings than at the high settings. It has been found that this is desirable in view of the tendency on the part of users to use additional blankets of substantial heat insulation value.

While it is preferred to employ the synchronous adjustment feature and the single control manual, as embodied in the device of Figs. 1 to 8 and as described above, in some instances it may be desirable to provide separate adjustments by means of two manual control elements. A device embodying this modification is shown in Figs. 11 and 12.

In this instance, the base plate 62 is generally similar to that of the first-described embodiment and carries a vertically adjustable element 63 similar to the sleeve 29 of the first embodiment, the element 63 being actuated by an arm 64. A cam 65, carried by element 63, engages member 66 to position the heater element with respect to the bimetal element 67, as in the first embodiment. Thus the arm 64 is adjustable to vary the rate at which the blanket or other object is energized. In this instance, however, the cover 68 carries an adjustable screw 69 which is provided with a control knob 70. The lower end of the screw 69 engages an arm 71 secured to the bimetal element 67, and adjustment of the screw 69 through the medium of knob 70 varies the position of the bimetal element so as to vary the setting of the device to effect energization at a paticular room temperature.

Thus, in this instance, there are two manual control elements, i. e. arm 64 and knob 70, which independently control the rate of blanket energization and the initial operating temperature. In all other respects, the device is similar to the first-described embodiment.

In the above-described devices, the adjustment of the rate of change of the blanket temperature in relation to the ambient air temperature is varied by moving the heater of the control device in relation to the thermostatic element. However, the same result may be achieved in other ways. Figs. 13 to 19 are diagrammatic illustrations of various other arrangements for accomplishing this purpose.

In Fig. 13 the heater 72 is stationary and the effect thereof on the bimetal element 73 is varied by means of a heat shield 74 interposed between the heater and the bimetal element, and carried by a screw 75 which is rotatable by means of knob 76. The heat shield 74 serves variously to retard the transfer of heat from the heater 72 to the bimetal element 73, depending upon the position of the heat shield. In this instance, the same control manual serves to adjust the position of the bimetal element through the medium of arm 77.

In Fig. 14 a similar arrangement is employed and the parts corresponding to those of Fig. 13 are similarly designated, but in this instance the heat transfer between the heater 72 and the bimetal element 73 is varied by means of a heat reflecting hood 78 which reflects more or less heat from heater 72 toward the bimetal element 73, depending upon the adjustment of the reflecting hood.

In Figs. 15 and 15a, the desired variation or adjustment is effected by varying the amplitude of the current through the heater 72 which again is in fixed association with the bimetal element 73. In this instance, a current varying resistor 79 is employed and is controlled by knob 76 through the medium of arm 80 carried by the screw 75.

In Fig. 16 the heat transfer between heater 72 and bimetal element 73 is varied by means of a heat conducting member 81 mounted on screw 75 and arranged in heat transfer relation to the casing or housing 82, preferably through the medium of a heat conducting element 83 on the housing. In this instance the member 81 variously absorbs heat from the heater 72, depending upon the position of said member.

In Figs. 17 and 17a the desired variation or adjustment is effected by varying the effective length of the bimetal element 84. A sleeve 85 is slidably mounted on the bimetal element and has a gear rack 86 thereon which is engaged by a pinion 87 carried by the extended shank 88 of screw 89. Adjustment of the sleeve varies the sensitivity or response of the bimetal element to the heat from the heater 90, thus effectively varying the influence of the heater on the bimetal element. At the same time, the bimetal element is adjustable through the medium of arm 91, the rack and pinion permitting such adjustment.

In Fig. 18 the casing 92 is provided with vent louvres 93 in the vicinity of the heater 94, and a vent closing panel 95 is carried by screw 96 and is operable by a handle 97. By means of this arrangement, the heat loss of heater 94 is varied to vary its influence on the bimetal element 98. At the same time, the bimetal element is adjusted by screw 96 through the medium of arm 99.

In Fig. 19, two heaters 100 and 101 are employed in conjunction with a two-position switch 102. The latter comprises a movable contact member 103 pivoted at 104 and adapted to engage contacts 105, 106 and 107. When the contact member 103 is in the solid line position shown, the two heaters 100 and 101 are in series and are mutually operative to influence the bimetal element 108. When the contact member 103 is in its other position, the heater 101 is disconnected so that only the heater 100 is operative to influence the bimetal element. In this instance the bimetal element is adjustable by means of the screw 109 and the control knob 110.

Thus, it will be seen that the principal features of the present invention may be realized in a variety of different physical forms. It will be understood, therefore, that the invention is not limited to any specific physical structure but contemplates any structure which embodies the novel features herein described.

I claim:

1. A device for controlling an electrically-heated bed cover or the like so as to compensate for the various factors which affect the user's comfort, comprising an adjustable thermostatic switch under control of the user during use, adapted to be connected in circuit with the heating means of said cover and subject to the temperature of the ambient air, the adjustment of said switch determining the air temperature at which the switch will initiate energization of said cover, an electric heating element adjustably mounted in cooperative association with said switch to influence the same and also adapted to be connected in circuit with the cover heating means, said switch and the associated heating element serving cooperatively to vary the energy input to said cover in inverse relation to the ambient air temperature, and adjustable means under control of the user during use for varying the position of said heating element to thus vary the rate of automatic variation of said energy input by said switch and its associated heating element, so as to meet the requirements for constant comfort of the user as affected by body heat loss, thermal insulation of a bed, and the possible use of additional covering.

2. A device for controlling an electrically-heated bed cover or the like so as to compensate for the various factors which affect the user's comfort, comprising an arcuately movable control arm manually adjustable by the user to select an ambient air temperature at which it is desired that said cover shall become energized, a thermostatic switch adapted to be connected in circuit with the heating means of said cover and subject to the temperature of the ambient air, said switch including a stationary contact element and a movable contact element, a screw-threaded adjusting member rotatable by said arm and axially movable thereby to vary the position of said movable contact element, the adjustment of said switch determining the air temperature at which the switch will initiate energization of said cover, a heater element adjustably mounted in cooperative association with said switch to influence the same and also adapted to be connected in circuit with the cover heating means, said switch and said heater serving cooperatively to vary the energy input to said cover in inverse relation to the ambient air temperature, and cam means on said adjusting member controllable by said arm to vary the position of said heater and thus vary the rate of automatic variation of said energy input according to the setting of said control member, so as to meet the requirements for constant comfort of the user as affected by body heat loss, thermal insulation of a bed, and the possible use of additional covering.

3. A device for controlling an electrically-heated bed cover or the like so as to compensate for the various factors which affect the user's comfort, comprising adjustable means for effecting energization of said cover at and below a selected temperature of the ambient air, and for automatically varying the energy input to said cover in inverse relation to the ambient air temperature, adjustable means for changing the rate of automatic variation of said energy input by said first means, and a single manual control member operable by the user to effect correlated adjustment of the two aforementioned adjustable means, whereby the rate of automatic variation of the energy input with ambient air temperature is progressively increased as progressively higher ambient energization temperatures are selected, so that the controlled cover is caused to meet the requirements for constant comfort of the user as affected by body heat loss, thermal insulation of a bed, and the possible use of additional covering.

4. A device for controlling an electrically-heated bed cover or the like so as to compensate for the various factors which affect the user's comfort, comprising adjustable means for effecting energization of said cover at and below a selected temperature of the ambient air, and for automatically varying the energy input to said cover in inverse relation to the ambient air temperature and in sufficient amount to cause a rise in the temperature of said cover as the air temperature decreases, adjustable means for changing the rate of automatic variation of said energy input by said first means so as to change the rate of rise of the cover temperature as the air temperature decreases, and a single manual control member operable by the user to effect correlated adjustment of the two aforementioned adjustable means, whhereby the rate of automatic variation of the energy input with ambient air temperature is progressively increased as progressively higher ambient energization temperatures are selected, so that the controlled cover is caused to meet the requirements for constant comfort of the user as affected by body heat loss, thermal insulation of a bed, and the possible use of additional covering.

5. A device for controlling an electrically-heated bed cover or the like so as to compensate for the various factors which affect the user's comfort, comprising a rotatively movable control member manually adjustable by the user during use to select an ambient air temperature at which it is desired that said cover shall become energized, a thermostatic switch adapted to be connected in circuit with the heating means of said cover and subject to the temperature of the ambient air, said switch including a stationary contact element and a movable contact element, a screw-threaded adjusting member rotatable by said first member and axially movable thereby to vary the position of said movable contact element, the adjustment of said switch determining the air temperature at which the switch will initiate energization of said cover, a heater element arranged in cooperative association with said switch to influence the same and also adapted to be connected in circuit with the cover heating means, said switch and said heater serving cooperatively to vary the energy input to said cover in inverse relation to the ambient air temperature, and means operable by said adjusting member to vary the influence of said heater element on said switch and thus vary the rate of automatic variation of said energy input according to the setting of said control member and in correlation with the adjustment of said switch, so as to meet the requirements for constant comfort of the user as affected by body heat loss, thermal insulation of a bed, and the possible use of additional covering.

6. A device for controlling an electrically-heated bed cover or the like so as to compensate for the various factors which affect the user's comfort, comprising a movable control member manually adjustable by the user during use to select an ambient air temperature at which it is desired that said cover shall become energized, a thermostatic switch adapted to be connected in circuit with the heating means of said cover and subject to the temperature of the ambient air, said switch including a stationary contact element and a movable contact element, means controlled by said member to vary the position of said movable contact element, the adjustment of said switch determining the air temperature at which the switch will initiate energization of said cover, a heater element adjustably mounted in cooperative association with said switch to influence the same and also adapted to be connected in circuit with the cover heating means, said switch and said heater serving cooperatively to vary the energy input to said cover in inverse relation to the ambient air temperature, and cam means controlled by said member to vary the position of said heater and thus vary the rate of automatic variation of said energy input according to the setting of said control member, so as to meet the requirements for constant comfort of the user as affected by body heat loss, thermal insulation of a bed, and the possible use of additional covering.

7. A device for controlling an electrically-heated bed cover or the like so as to compensate for the various factors which affect the user's comfort, comprising a casing, a thermostatic switch within said casing including relatively movable contacts and a thermomotive element arranged to effect closing relative movement of the contacts in response to decreasing air temperature and opening relative movement of the contacts in response to increasing air temperature, an electrical heater within said casing in proximity to said thermomotive element to thermally influence the same, said switch and said heater being adapted to be connected in circuit with the heating means of said cover, and serving cooperatively to vary the energy input to said cover in inverse relation to the ambient air temperature, a manually-adjustable member extending from said casing, means operable by said member for adjusting said switch to effect energization of said cover at and below one of a plurality of selectable ambient air temperatures corresponding to predetermined general temperature levels of bed cover operation, and means also operable by said member for varying the influence of said heater on said thermomotive element in predetermined inverse relation to the selectable ambient air temperatures, whereby said heater exerts minimum influence on said thermomotive element when the highest ambient air temperature is selected and progressively greater influence when progressively lower ambient air temperatures are selected, thus varying the rate of the aforementioned variation of the energy input to said cover in predetermined direct relation to the selected ambient air temperature, so as to meet the requirements for constant comfort of the user as affected by body heat loss, thermal insulation of a bed, and the possible use of additional covering.

8. A device for controlling an electrically-heated bed cover or the like so as to compensate for the various factors which affect the user's comfort, comprising a casing, a thermostatic switch within said casing including relatively movable contacts and a thermomotive element arranged to effect closing relative movement of the contacts in response to decreasing air temperature and opening relative movement of the contacts in response to increasing air temperature, an electrical heater within said casing in proximity to said thermomotive element to thermally influence the same, said switch and said heater being adapted to be connected in circuit with the heating means of said cover, and serving cooperatively to vary the energy input to said cover in inverse relation to the ambient air temperature, a manually-adjustable member extending from said casing, means operable by said member for adjusting said switch to effect energization of said cover at and below one of a plurality of selectable ambient air temperatures corresponding to predetermined general temperature levels of bed cover operation, and means also operable by said member for varying the spacing between said heater and said thermomotive element in predetermined direct relation to the selectable ambient air temperatures, whereby said heater exerts minimum influence on said thermomotive element when the highest ambient air temperature is selected and progressively greater influence when progressively lower ambient air temperatures are selected, thus varying the rate of the aforementioned variation of the energy input to said cover in predetermined direct relation to the selected ambient air temperature, so as to meet the requirements for constant comfort of the user as affected by body heat loss, thermal insulation of a bed, and the possible use of additional covering.

9. A device for controlling an electrically-heated bed cover or the like so as to compensate for the various factors which affect the user's comfort, comprising a casing, a thermostatic switch within said casing including relatively movable contacts and a thermomotive element arranged to effect closing relative movement of the contacts in response to decreasing air temperature and opening relative movement of the contacts in response to increasing air temperature, an electrical heater within said casing adjustably mounted in proximity to said thermomotive element to thermally influence the same, said switch and said heater being adapted to be connected in circuit with the heating means of said cover, and serving cooperatively to vary the energy input to said cover in inverse relation to the ambient air temperature, a manually-adjustable member extending from said casing, means operable by said member for adjusting said switch to effect energization of said cover at and below one of a plurality of selectable ambient air temperatures corresponding to predetermined general temperature levels of bed cover operation, and means also operable by said member for moving said heater so as to vary the spacing between it and said thermomotive element in predetermined direct relation to the selectable ambient air temperatures, whereby said heater exerts minimum influence on said thermomotive element when the highest ambient air temperature is selected and progressively greater influence when progressively lower ambient air temperatures are selected, thus varying the rate of the aforementioned variation of the energy input to said cover in predetermined direct relation to the selected ambient air temperatures, so as to meet the requirements for constant comfort of the user as affected by body heat loss, thermal insulation of a bed, and the possible use of additional covering.

10. A device for controlling an electrically-heated bed cover or the like so as to compensate for the various factors which affect the user's comfort, comprising a casing having a slot opening, a thermostatic switch within said casing including fixed and movable contacts and a bimetallic strip fixed at one end and carrying the movable contact at its other end, said switch being adapted to be connected in circuit with the heating means of said cover and being subject to the temperature of the ambient air, an insulating arm within said casing having one end fixed and its other end free and in proximity to said bimetallic strip, a heater adapted to be connected in circuit with the cover heating means and comprising resistance wire wound on the free end portion of said insulating arm so as to be in proximity to said bimetallic strip, a manual adjustment arm extending from within said casing through said slot opening and arcuately movable about an axis in the casing within the limits defined by said slot opening, means operable by said adjustment arm to adjust said bimetallic strip and the movable switch contact according to a selected ambient air temperature at which it is desired that said switch shall close to initiate energization of said cover, said switch and said heater serving cooperatively to vary the energy input to said cover in inverse relation to the ambient air temperature, and means also operable by said adjustment arm to adjust the heater-carrying portion of said insulating arm so as to vary the position of said heater relative to said bimetallic strip in predetermined inverse relation to the adjustment of the movable switch contact relative to the fixed switch contact, thereby to vary the rate of the aforementioned variation of the energy input to said cover in direct relation to the selected ambient air temperature, so as to meet the requirements for constant comfort of the user as affected by body heat loss, thermal insulation of a bed, and the possible use of additional covering.

11. A device for controlling an electrically-heated bed cover or the like so as to compensate for the various factors which affect the user's comfort, comprising a thermostatic switch adapted to be connected in circuit with the heating means of said cover and subject to the temperature of the ambient air, said switch including a stationary contact element and a movable contact element, a screw-threaded member rotatable and axially movable by the user to vary the position of said movable contact element, the adjustment of said switch determining the air temperature at which the switch will initiate energization of said cover, a heater element adjustably mounted in cooperative association with said switch to influence the same and also adapted to be connected in circuit with the cover heating means, said switch and said heater serving cooperatively to vary the energy input to said cover in inverse relation to the ambient air temperature, and cam means rotatable by the user to vary the position of said heater and thus vary the rate of automatic variation of said energy input by said switch and said heater, whereby the controlled cover is caused to meet the requirements for constant comfort of the user as affected by body heat loss, thermal insulation of a bed, and the possible use of additional covering.

12. A device for controlling an electrically-heated bed cover or the like so as to compensate for the various factors which affect the user's comfort, comprising a thermostatic switch adapted to be connected in circuit with the heating means of said cover and subject to the temperature of the ambient air, said switch including a stationary contact element and a movable contact element, a screw-threaded member rotatable and axially movable to vary the position of said movable contact element, the adjustment of said switch determining the air temperature at which the switch will initiate energization of said cover, a heater element adjustably mounted in cooperative association with said switch to influence the same and also adapted to be connected in circuit with the cover heating means, said switch and said heater serving cooperatively to vary the energy input to said cover in inverse relation to the ambient air temperature, rotatable cam means arranged to vary the position of said heater and thus vary the rate of automatic variation of said energy input by said switch and said heater, and manual means under control of the user for effecting adjustment of said member and said cam means, whereby the controlled cover is caused to meet the requirements for constant comfort of the user as affected by body heat loss, thermal insulation of a bed, and the possible use of additional covering.

CHARLES ROGER TURNER.

REFERENCES CITED

The following references are of record in the file of this patent:

UNITED STATES PATENTS

| Number | Name | Date |
|---|---|---|
| 1,812,722 | Spencer | June 30, 1931 |
| 1,845,357 | Spencer | Feb. 16, 1932 |
| 1,908,676 | Appelberg | May 16, 1933 |
| 2,007,596 | Burke | July 9, 1935 |
| 2,044,147 | Bletz | June 16, 1936 |
| 2,145,722 | Hall | Jan. 31, 1939 |
| 2,195,947 | Uhlrig | Apr. 2, 1940 |
| 2,195,958 | Kearsley | Apr. 2, 1940 |
| 2,344,820 | Kearsley | Mar. 21, 1944 |
| 2,354,918 | Kearsley | Aug. 1, 1944 |
| 2,395,152 | Taylor | Feb. 19, 1946 |
| 2,436,735 | Walder et al. | Feb. 24, 1948 |

FOREIGN PATENTS

| Number | Country | Date |
|---|---|---|
| 448,761 | Germany | Aug. 27, 1927 |